United States Patent [19]

Gagliani et al.

[11] Patent Number: 4,842,948

[45] Date of Patent: Jun. 27, 1989

[54] METHODS AND COMPOSITIONS FOR PRODUCING POLYIMIDE COATINGS

[76] Inventors: John Gagliani, 6280 Lance Pl., San Diego, Calif. 92120; John V. Long, 1756 E. Lexington Ave., El Cajon, Calif. 92121

[21] Appl. No.: 746,858

[22] Filed: Jun. 20, 1985

Related U.S. Application Data

[62] Division of Ser. No. 682,574, Dec. 17, 1984, Pat. No. 4,601,908.

[51] Int. Cl.$^4$ .......................... B32B 27/00; B05D 5/10
[52] U.S. Cl. .............................. 428/473.5; 427/207.1; 428/335
[58] Field of Search ............................. 428/473.5, 335; 427/207.1

[56] References Cited

U.S. PATENT DOCUMENTS

| | | | |
|---|---|---|---|
| 4,161,477 | 7/1979 | Long et al. | 538/324 |
| 4,183,838 | 1/1980 | Gagliani | 528/324 |
| 4,183,839 | 1/1980 | Gagliani | 528/324 |
| 4,442,283 | 4/1984 | Gagliani et al. | 528/324 |

*Primary Examiner*—Lorraine T. Kendell
*Attorney, Agent, or Firm*—Frank D. Gilliam

[57] ABSTRACT

Methods and compositions for producing imide precursors and polyimide coating and adhesives. Basically a mixture of an oxoimine such as caprolactam, a dianhydride such as 3,3', 4,4'-benzophenone tetracarboxylic acid dianhydride and a solvent such as dimethyl formamide is heated to a temperature of about 60° to 120° C. for a suitable period, then the mixture is cooled and a suitable diamine is added to produce the imide precursor. This mixture may be dried to a powder form or may be used directly as a coating or adhesive. The final polyimide is produced by heating the precursor to a suitable temperature over an appropriate period.

23 Claims, No Drawings

METHODS AND COMPOSITIONS FOR PRODUCING POLYIMIDE COATINGS

This is a division of application Ser. No. 682,574, filed 12/17/84, now U.S. Pat. 4,601,908.

BACKGROUND OF THE INVENTION

This invention relates in general to polyimide coatings and adhesives and more specifically to methods and compositions for producing imide precursors and polyimides for use as adhesives and coatings.

A number of different imide-based coating and adhesive compositions have been described in prior patents, such as those described in U.S. Pat. Nos. 4,161,477; 4,183,838 and 4,183,139. These prior polyimide forming compositions and methods produced polyimide coatings and adhesives suitable for some applications but a number of problems remained limiting the usefulness of such polyimides. These problems have been overcome by our methods and compositions and the coatings and adhesives we produce.

Prior coating compositions often did not adhere well to both metallic and non-metallic surfaces especially when fillers were used, and the adhesive compositions often had low peel strength, especially at elevated temperatures. The prior materials required high reaction temperatures and/or long periods at elevated temperatures to produce imide precursors and special vessels or reactors to produce said precursors which are very costly and processes time consuming.

Thus, it can be seen that there is a continuing need for polyimide materials having improved production methods and compositions.

It is therefore an object of this invention to provide methods and compositions for the production of imide precursors and polyimide coatings and adhesives which overcome the above-noted problems.

Another object of this invention is to provide a method of producing imide precursors which uses relatively low temperatures and short heating periods.

A further object of this invention is to produce polyimide coatings and adhesives having superior physical properties including freedom from pinholes, bubbles and similar defects, high peel resistance and resistance to abrasion and high temperatures.

Yet another object of this invention is to provide polyimide forming precursor compositions which have improved shelf lives, adhere well to a variety of metallic and non-metallic substrates and to shape edges, and can be applied using a variety of solvents and conventional coating techniques.

SUMMARY OF THE INVENTION

The above objects, and others, are accomplished in accordance with this invention, fundamentally by a method which comprises adding an oxoimine and a dianhydride to a suitable solvent, maintaining the mixture at a temperature of from about 30° to 120° C. and stirring until solution is complete, (about 30 to 120 minutes) cooling the solution to a temperature of about 20° to 60° C. then adding a suitable diamine (or mixture of diamines) and stirring until solution is complete (about 30 to 60 minutes). The ratio of oxoimine to dianhydride may be in the mole range of about just above 0:1 to 10:1. We have found that compositions produced at the higher ratios do not possess best adhesion characteristics. This is primarily caused by the amino caproic acid liberated during the high temperature curing reaction. However, oxoimine to dianhydride ratios above 0:1 but lower than 1:1 yield resin compositions which overcome this deficiency and yield superior characteristics as adhesives. The resulting novel imide precursors may be stored as a solution or may be dried to a powder as desired.

For optimum results, the mixture of oxoimine and dianhydride is initially held at a temperature of from about 90° to 100° C., followed by cooling to a temperature of about 40° to 50° C.

The solution (or powder as a powder or re-dissolved in any suitable solvent) may be coated onto a substrate by any suitable method, then may be heated to a temperature in the range of about 175° to 320° C. for about 30 minutes to 5 hours, depending upon the temperature employed, to convert the precursor to high molecular weight polyimide. When used as an adhesive, the precursor is pressed, with moderate pressure, between the surfaces to be bonded during the curing period.

Typical curing parameters include 5 hours at 177° C., 3 hours at 232° C., 2 hours at 260° C. or 30 minutes at 316° C. If desired, staged curing temperatures can advantageously be employed, especially in laminating applications. One examplary curing cycle of this character is 2 hours at 149° C., 3 hours at 204° C., and 1 hour at 316° C.

Our novel imides are made by reacting an aromatic tetracarboxylic acid dianhydride and a diamine with a cyclic amide or oxoimine; i.e., a compound of the formula

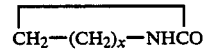

wherein x is from 4 to 7.

Other preferred oxoimines are 2-piperidone, 2-pyrrolidone and amino acids derived from these three preferred cyclic lactams, namely 6-amino caproic acid, 5-amino valeric acid and 4-amino butyric acid. These preferred oxoimines may be each used alone or may be combined in any suitable mixtures.

A wide variety of dianhydrides can be employed in practicing our invention. Suitable dianhydrides include those disclosed in U.S. Pat. Nos. 3,282,897, issued Nov. 1, 1966, and 3,310,506, issued Mar. 21, 1967, both incorporated herein by reference.

The preferred dianhydrides are pyromellitic dianhydride and 3,3', 4,4'-benzophenone tetracarboxylic acid dianhydride (BTDA). The preference for these two dianhydrides is based principally upon their availability in commercial quantities at reasonable prices.

A preferred oxoimine is caprolactam,

although those lactams with five- and seven-membered rings
also give excellent results. For the purposes of this patent application, "oxoimine" includes, in addition to the above cyclic lactams, amino acids derived therefrom, e.g., 6-amino caproic acid, 5-amino valeric acid, 4-amino butyric acid or the like.

A variety of aromatic diamines and aromatic diamines with aliphatic groups in the molecule and aliphatic diamines may be used in preparing our novel imide-forming materials. For high temperature applications aliphatics are avoided because the aliphatic moiety may have an adverse effect on thermal stability.

Suitable diamines include, but are not limited to: meta-phenylene diamine; para-phenylene diamine; 4,4'-diaminodiphenyl ether; 4,4'-diaminodiphenyl sulfone; 3,3'-diaminodiphenyl sulfone; 4,4'-diaminodiphenyl methane; and mixtures of two or more thereof.

Other diamines which may be employed, when suitable, alone and in various admixtures, are disclosed in U.S. Pat. Nos. 3,282,897 and 3,310,506 and 3,391,120, hereby also incorporated by reference. While a 100% portion of the diamine used may be aliphatic it is preferred that, at least about 50 mole % of the diamine be an aromatic diamine.

Any suitable mixture of polar or non-polar solvents may be used. The solvent may be aliphatic or aromatic and may benefit from the inclusion of amino or halogen substituents. Solvents which are preferred because of their relatively low cost, wide availability, low boiling points, and possession of minimal undesirable properties include: aliphatic and aromatic alcohols, N,N-dialkyl-carboxyamides, ketones and mixtures thereof.

Any suitable quantity of solvent may be used. In general, it is preferred that the quantity of solvent be in the range of 5 to 10 moles solvent per mole dianhydride. The quantity of solvent should preferrably be sufficient to produce a final resin having a solids content of between 10 and 60 wt. %. Excess solvent tends to cause low viscosity resins that tend to drip when coated, while insufficient solvent results in very viscous liquids that are difficult to use. Additional solvent can be added after completion of the imide-forming reaction to reduce viscosity, if desired.

If desired, the solvent can be evaporated from the precursor to reduce it to solid form using spray drying or other conventional techniques. This is not necessary, however, as the solutions are stable at room temperature and can be stored indefinitely.

Furthermore, these novel solutions can be applied to any of a variety of suitable substrates. Typical substrates include stainless steels, aluminum, titanium, copper, steel and other metals, glasses, and plastics and substrates with complicated geometrical configurations. The solution may be applied by such conventional and relatively inexpensive techniques as dip and spray coating.

Our novel coating materials are preferably applied in thickness of not more than 1-3 mils in single application operations. Thicker applications may result in pinholes and other flaws. Thicker coatings can, however, readily be obtained by building up the coating thickness in two or more stages.

A second lamina can be bonded to the coated substrate by heating the two laminae to temperatures as low as 170° C. under pressure as low as 50 psig for approximately one second.

The adhesion characteristics of the coating or adhesive can be improved by the use of selected additives and/or adhesion promoters. The preferred adhesion promoters are reaction products of an aromatic acid dianhydride and a primary amine terminated alkoxy silane. The preferred dianhydrides are 3,3', 4,4'-benzophenonetetracarboxylic acid dianhydride and pyromellitic dianhydride. The preferred silane is aminopropyl triethoxy silane. However, other dianhydrides including those disclosed in the patents incorporated by reference above can be employed. Similarly, we contemplate the use of other silanes excepting those having other than primary amine terminal groups.

These adhesion promoters may be used in any suitable amounts. We prefer amount which result in up to 0.1 molecular parts of silane to one molecular part of diamine or diamines being present in the final composition. Higher proportions of the silane produce greater adhesion but may cause brittleness and are accordingly generally used only where more brittle coatings can be tolerated.

Our novel coating and adhesive compositions possess an outstanding degree of wetability. As a consequence, a virtually limitless variety of organic and inorganic fillers are suitable for addition to the composition to promote wanted characteristics in the polymer and/or to provide it with additional desirable characteristics. Fillers which we have to be especially desirable include fluorinated hydrocarbons (e.g., Teflon®), powdered aluminum, copper, steel, chromium oxide, aluminum phosphate, aluminum chromate, powdered glass magnesium phosphate, and mixtures of the foregoing.

The filler may be added in any suitable conventional manner. Typically it may be simply milled into the precursor in a ball mill at room temperature until the mixture becomes homogeneous.

The amount of filler will of course vary from application-to-application depending upon the particular filler, the purpose for which it is incorporated, and other factors. In general, filler-to-resin ratios as high as 2.5 parts by weight of filler to one part by weight of resin can be employed without resin starvation and consequent formation of a soft and porous coating although a 1:1 ratio in general tends to give the best results. Higher ratios can be employed in applications where a resin starved composition is wanted or acceptable although such compositions are in general not employed to any great extent in the applications for which our novel compositions are best suited.

One particularly preferred filler is a mixture of 8 to 20 parts aluminum hydroxide, 15 to 50 parts of magnesium oxide, and 150 to 300 parts of phosphoric acid used in a ratio of one part by weight of filler per part of precursor composition. This filler imparts outstanding high temperature resistance to the final coating or adhesive.

Any suitable flow control agents and wetting agents can also be added to the precursor composition to improve the properties of the coating or adhesive.

Furthermore, because our novel compositions possess high solubility, they can be applied by a wide variety of coating techniques. Also, as mentioned above, our novel coatings can be applied to sharp edges and to complex shapes. This is due primarily to their wetability and adhesion.

Other objects and advantages and additional novel features of our invention will be apparent to those skilled in the relevant arts from the foregoing description of the invention, from the appended claims, and from the following examples, which are intended only to illustrate preferred embodiments and not restrict the scope of the invention.

EXAMPLE I

A precursor of the character we contemplate is prepared as follows:

3,3', 4,4'-Benzophenonetetracarboxylic acid dianhydride (BTDA) (322 g, 1 M); dimethyl formamide (500 g) and caprolactam (30 g, 0.265 M) are placed in two-liter flasks, the mixture is heated to a temperature between 30° and 120° C., and maintained at that temperature for 60 minutes. Into the mixture is added 4,4'-Diaminodiphenyl ether (200 g, 1 M) and the mixture is stirred for 10 minutes at 55° C., producing a viscous liquid. To the mixture is added 800g of a mixture containing equal parts by weight of acetone, methylisobutyl ketone, and dimethylacetamide. The mixture is then stirred at 40° C. for 1 hour, becoming homogeneous.

The resulting product is useful as coating and adhesive as detailed in examples which follow and possesses an indefinite shelf life.

EXAMPLE II

The composition of Example I is sprayed onto 410 stainless steel panels using a De Vilbiss spray gun with an F fluid tip and an air pressure of 50 psig. The composition is dried at 120° C. for 10 minutes, evaporating the carrier and producing a tough, hard, abrasion resistance coating having a thickness of about 3 mils. The coating is found to have superior coating continuity. Thereafter, the coating is cured at a temperature of 316° C. for 30 minutes to effect the imide reactions. The coating became even harder and is found to be resistant to solvents, oils, acids, and salt sprays and to elevated temperatures.

EXAMPLE III

The composition of Example I is sprayed on two aluminum panels. The resin is dried at 120° C. for 10 minutes, evaporating the carrier and producing a hard coating. The two aluminum panels are joined and placed in a press preheated at 220° C. and 100 psi pressure is applied. The aluminum panels are maintained at these conditions for 30 minutes. After cooling the sample is removed from the press and found to be bonded well. The bonded panel is post cured at 260° for one to five hours in an electrically heated oven. The shear strength of the adhesive layer was higher than 1000 psi.

EXAMPLE IV

To demonstrate the usefulness of fillers in our polyimide coating compositions, 13 parts by weight of aluminum hydroxide, 30 parts of magnesium oxide, and 240 parts of phosphoric acid are blended at 100° C. Seventy parts by weight of dimethylformamide is milled into this mixture; and the resulting mixture is blended with 400 parts of the resin produced in Example I.

The composition thus obtained is spray coated onto a stainless steel panel as described in Example II; and the composition is cured to effect the imide reactions at 316° C. for 30 minutes, yielding a polyimide of the formula

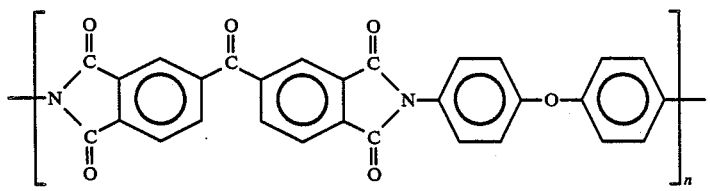

wherein n is a positive integer.

The coating is found to be resistant to sustained temperatures of 320° C. with periodic excursions to temperatures as high as 540° C.

EXAMPLE V

The procedure described in Example IV is repeated using as an additive or filler a composition containing 30 parts of the filler mixture first described in Example IV, 70 parts of dimethyl acetamide, and 30 parts of finely pulverized aluminum powder. This mixture is added to 400 parts of the resin of Example I, and the product is coated onto a stainless steel panel and cured as described in Example II.

The cured coating is hard and resistant to temperatures as high as 320° C. periodically increased to 540° C.

EXAMPLE VI

To demonstrate how thicker coatings than that resulting from the procedure described in Example II can be obtained, that procedure is repeated three times applying three 1-2 mil coatings of the Example I formulation and drying the coating at 95° C. in an air circulating oven after each application. After the third application is dried, the coating is cured for 1 hour at 149° C., 2 hours at 232° C., 30 mintues at 260° C. and 30 minutes at 316° C. A fully cured, homogeneous coating was obtained.

EXAMPLE VII

To demonstrate that other aromatic diamines can be used in forming our novel polyimide precursors, the procedure of Example I is repeated using 248 g (1.0 M) of 4,4'-diaminodiphenyl sulfone in place of the 4,4'-diaminodiphenyl ether. The final resin solution or coating composition is stable at room temperature and yielded excellent light colored coatings.

EXAMPLE VIII

The suitability of a diamine mixture instead of a single diamine is demonstrated by repeating the procedure described in Example I using a mixture of 4,4'-diaminodiphenyl methane (99.1g, 0.5M) and para-phenylene diamine (59g, 0.5M) in place of the 4,4'-diaminodiphenyl oxide.

The final resin or coating solution is stable at room temperature and yields coatings which possess outstanding abrasion resistance.

EXAMPLE IX

To demonstrate how wetting and flow control agents may be employed and that aromatic anhydrides other than BTDA can be employed in making the novel polyimides of the present invention, a sample is prepared as follows: pyromellitic dianhydride (218.12 g, 1 M) dimethyl acetamide (500 g) and caprolactam (304 g, 2.7 M) are placed in a two liter flask, heated to a selected temperature between 30°-120° C., and maintained at that temperature for 60 minutes.

The mixture is then cooled to 50° C. At this point 4,4'-diaminodiphenyl methane (198.2g 1M) is added to the sample and the mixture is stirred for 10 minutes at 50° C. To the resulting viscous liquid is added 800 g of an equal weight mixture of acetone, methylisobutyl ketone, ethyl alcohol, and dimethyl acetamide. The mixture is stirred at 30° C. for 1 hour. General Electric SR-82 flow control agent (1.5 g) is added to the mixture and stirred for an additional 30 minutes to complete the process.

The final coating resin is found to produce a useful coating by curing it at 200° C. for 1 hour.

EXAMPLE X

To demonstrate the use of an adhesion promoter, a polyimide precursor is first prepared by the following procedure:

Caprolactam (45.2g, 0.4 M); dimethyl acetamide (200g) and BTDA (161g 0.5 M) are placed in a two-liter flask, heated to a temperature of 90° C., and maintained at that temperature for 60 minutes, then cooled to 50° C.

To the precursor is added 4,4'-diaminodiphenyl sulfone (37.2g, 0.15 M) and 10.8g (0.005 M) of the adhesion promoter. BTDA (30.6g, 0.095 M) is then added, and the mixture is stirred for 1 hour at 50° C. The resulting composition is a dark viscous liquid which remained stable for several months and is useful as a coating.

EXAMPLE XI

The procedure of Example I is repeated but 34.7g (0.265M) of 6 aminocaproic acid is used in place of caprolactam. The resulting resins are found to be very useful as adhesive compositions.

EXAMPLE XII

The procedures of Example I are repeated using 2 pyrrolidone (0.265M) (XIIa) and 2-piperidone (XIIb) in place of caprolactam. The coatings in each case is excellent and have excellent storage stability.

EXAMPLE XIII

To show that aliphatic diamines may be used in preparing said polyimide compositions the following composition is prepared using the procedure of Example IX is repeated except that benzophenone tetracarboxylic dianhydride (322.2g 1M), diamino hexane (116.2g 1M) and N-methyl pyrrolidone are used.

The resulting resin was coated on aluminum panel and cured at 190° C. to produce a homogeneous coating which was very flexible.

As discussed above and demonstrated by the working examples, the polyimide we have invented are particularly useful as coatings and adhesives. This is by no means the only purposes for which these materials can be advantageously employed, however. Accordingly, the discussion of coating and adhesive applications is in no way intended to limit the scope of protection to which we consider ourselves entitled.

Out invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A method of forming a coating on a surface which comprises the steps of:

providing a quantity of a solvent;
    adding thereto in either order, an aromatic tetracarboxylic acid dianhydride and from just above 0 to 10 moles of an oxoimine per mole of said dianhydride, said oxoimine having the general structure.

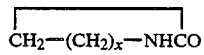

where x is 4 to 7:
    maintaining the resulting mixture at a temperature of from about 30° to 120° C.;
    stirring said mixture until solution is complete;
    cooling the resulting solution to a temperature of from about 20° to 60° C.;
    adding thereto about 1.0 moles of a diamine per mole of dianhydride;
    stirring until solution is complete;
    forming a layer of said material having a thickness of up to about 3 mils on a surface; and
    heating said material to a temperature of from about 175° to 320° C. for from about 30 minutes to 5 hours to form a smooth, adherent coating of a high molecular weight polymer.

2. The method according to claim 1 further including the additional steps of repeating the steps of forming a layer and heating said material at least 3 additional times to produce a thicker substantially flawless and pinhole-free coating.

3. The method according to claim 1 including the additional steps after the addition of said diamine and stirring of:
    drying the solution to a powder;
    storing said power for a selected period;
    dissolving said powder in a solvent to produce a liquid material.

4. The method according to claim 1 including the additional steps after the additional of said diamine and stirring of:
    drying the solution to a powder to produce a spreadable dry material.

5. The method according to claim 4 wherein said drying is accomplished by spray drying.

6. The method according to claim 1 wherein said aromatic tetracarboxylic acid dianhydride is selected from the group consisting of 3,3'4,4'- benzophenone tetracarboxylic acid dianhydride, pyromellitic dianhydride, and mixtures thereof.

7. The method according to claim 3 wherein said aromatic tetracarboxyic acid dianhydride is selected from the group consisting of 3,3', 4,4'- benzophenone tetracarboxylic acid dianhydride, pyromellitic dianhydride, and mixtures thereof.

8. The method according to claim 4 wherein said aromatic tetracarboxylic acid dianhydride is selected from the group consisting of 3,3', 4,4'- benxophenone tetracarboxylic acid dianhydride, pyromellitic dianhydride, and mixtures thereof.

9. The method according to claim 1 wherein the ratio of oxomine to dianhydride is from just above 0 to 10 and said oxoimine is selected from the group consisting of caprolactam, 2-pyrrolidone or 2-piperidone and mixture thereof.

10. The method according to claim 3, wherein the ratio of oxomine to dianhydride is from just above 0 to 10 and said oxoimine is selected from the group consisting of caprolactam, 2-pyrrolidone or 2-piperidone and mixture thereof.

11. The method according to claim 4 wherein the ratio of oxomine to dianhydride is from just above 0 to 10 and said oxoimine is selected from the group consisting of caprolactam, 2-pyrrolidone or 2-piperidone and mixture thereof.

12. The method according to claim 1 wherein said oxomine is caprolactam and said dianhydride is 3,3',4,4'-benzophenone tetracarboxylic acid dianhydride.

13. The method according to claim 3 wherein said oxoimine is caprolactam and said dianhydride is 3,3',4,4'-benzophenone tetracarboxylic acid dianhydride.

14. The method according to claim 4 wherein said oxoimine is caprolactam and said dianhydride is 3,3',4,4'-benzophenone tetracarboxylic acid dianhydride.

15. The method according to claim 1 wherein said solvent is dimethyl formamide and said diamine is 4,4'-diaminodiphenyl methane.

16. The method according to claim 3 wherein said solvent is dimethyl formamide and said diamine is 4,4'-diaminodiphenyl methane.

17. The method according to claim 4 wherein said solvent is dimethyl formamide and said diamine is 4,4'-diaminodiphenyl methane.

18. The method according to claim 1 wherein said mixture of oxoimine and dianhydride is initially maintained at a temperature of from about 90° to 100° C. until solution is complete, followed by cooling to a temperature of from about 40° to 50° C.

19. The method according to claim 3 wherein said mixture of oxoimine and dianhydride is initially maintained at a temperature of from about 90° to 100° C. until solution is complete, followed by cooling to a temperature of from about 40° to 50° C.

20. The method according to claim 4 wherein said mixture of oxoimine and dianhydride is initially maintained at a temperature of from about 90° to 100° C. until solution is complete, followed by cooling to a temperature of from about 40° to 50° C.

21. The product produced according to the method of claim 15.

22. The product according to the method of claim 4.

23. The product produced according to the method of claim 1.

* * * * *